J. A. PERKINS.
ROLLER BEARING.
APPLICATION FILED NOV. 26, 1912. RENEWED FEB. 8, 1917.

1,239,619.

Patented Sept. 11, 1917.
2 SHEETS—SHEET 1.

Attest:
Edgworth Greene
Thos. F. Burke

Inventor:
by Julius A. Perkins
J. Chris Larsen
Atty

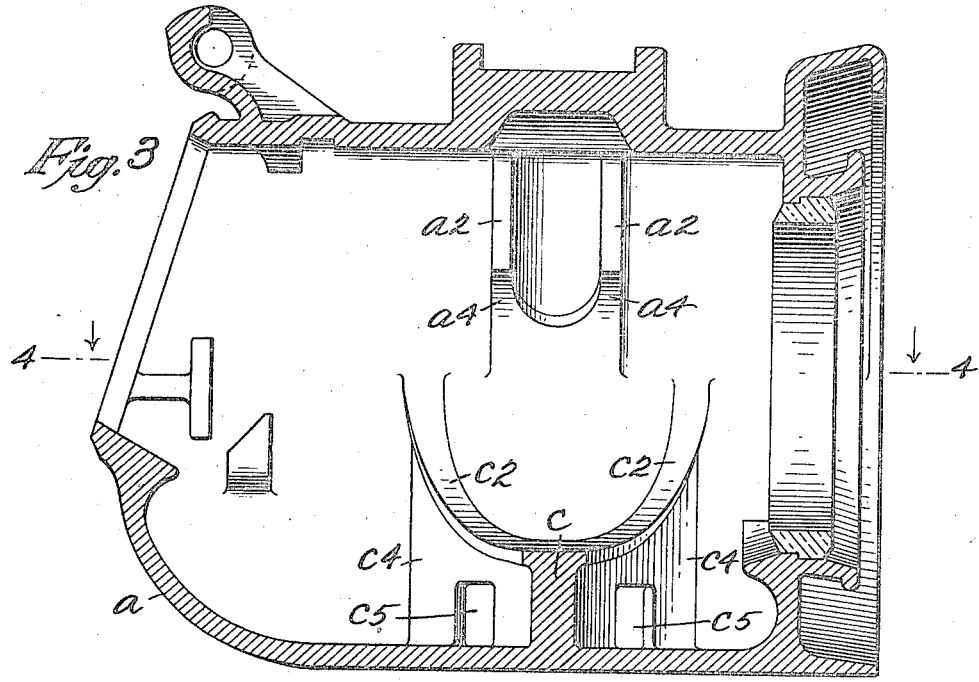
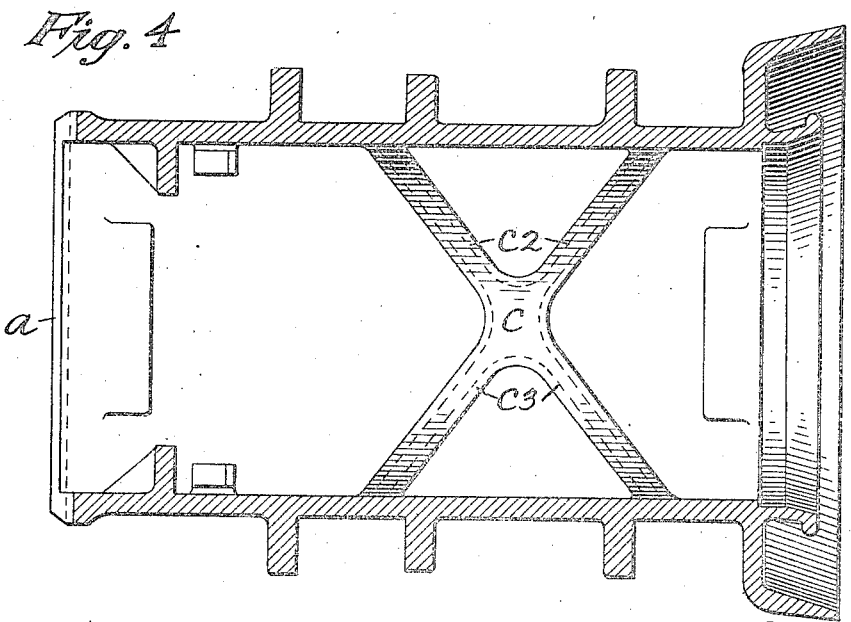

UNITED STATES PATENT OFFICE.

JULIUS A. PERKINS, OF OMAHA, NEBRASKA.

ROLLER-BEARING.

1,239,619.   Specification of Letters Patent.   Patented Sept. 11, 1917.

Original application filed December 9, 1908, Serial No. 466,582. Patent No. 1,002,441, dated September 5, 1911. Divided and this application filed November 26, 1912, Serial No. 733,592. Renewed February 8, 1917. Serial No. 147,493.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearings, of which the following is a specification, such as will enable those skilled in the art to which it appertains to make and use the same.

This invention relates to roller bearings with particular reference to the use thereof in car journal boxes and in which a cage is employed for guiding the rollers in their planetary movement about the journal of the car axle, said rollers being radially movable in said cage in the manner clearly set forth in an application for Letters Patent of the United States filed by me December 9, 1908, Serial No. 466,582, and the object thereof is to provide roller raceway tracks arranged beneath the said axle and which serve not only as supports for the said rollers at different points in the lengths thereof, whereby the rollers are permitted to readjust themselves at the point of full clearance from the journal if displaced for any cause, but also insures the clearing of all scale or other matter, from both tracks and rollers, which might become lodged thereon in the planetary movement of said rollers; a further object is to form the said tracks of two inclined members crossing each other centrally of said box and resembling, in plan view, the letter X, thus ensuring a central roller support at the point of full journal clearance; a further object is to so space the central portion of the said tracks, at the point where they cross each other, from the journal of the axle, as to permit a complete clearance of the said rollers from the said journal, this being accomplished by making the diameter of the outer bearing member, of which the said tracks are a part, slightly greater than the normal external diameter of the said cage of rollers, this being necessary in order to insert my cage of rollers within the said outer bearing member and, as the axial strain is at the top of the box and journal, the rollers at the bottom thereof, especially in the axial line of the journal, are free to clear the said journal and rest upon the said tracks; a further object is to provide a web for each of the said tracks, said webs being provided with openings therethrough permitting the free passage of lubricants when roller bearings are employed, and permitting also the insertion of oily waste or other packing if the usual frictional bearings should be employed instead of the roller bearings, and with these and other objects in view my invention consists in the construction hereinafter described and claimed.

My invention is fully described in the following specification, of which the accompanying drawings form a part, in which the separate parts are designated by the same reference characters in each of the views, and in which:—

Fig. 3 is a view similar to Fig. 1 but with the axle and bearings removed; and

Fig. 4 is a plan section on the the line 4—4 of Fig. 3.

Figure 1:
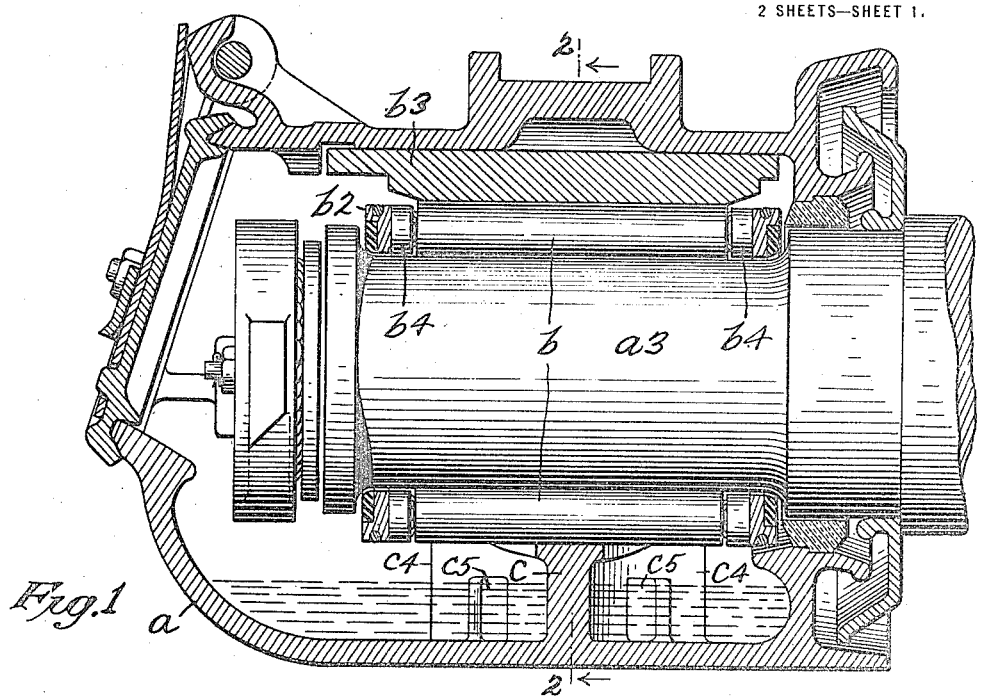
Figure 1 is a vertical section taken through a car journal box constructed in accordance with my present invention, and showing roller bearings therein.

In the drawings forming a part of this application I have shown a car journal box $a$ of conventional exterior and preferably adapted interiorally for the interchangeable use of the conventional brass and wedge frictional bearing and anti-frictional bearings, the latter being shown in the drawings and comprising a series of rollers $b$ carried by a cage $b^2$, between which and the top of the box interior a bearing member $b^3$ is employed, said bearing member being held by integral lugs $a^2$ on either side of the box interior, this construction being clearly set forth in the application above referred to, and the rollers encircle the journal of an axle $a^3$ within the said box, the said rollers being preferably provided with end guides $b^4$ radially movable in the cage $b^2$.

Figure 2:
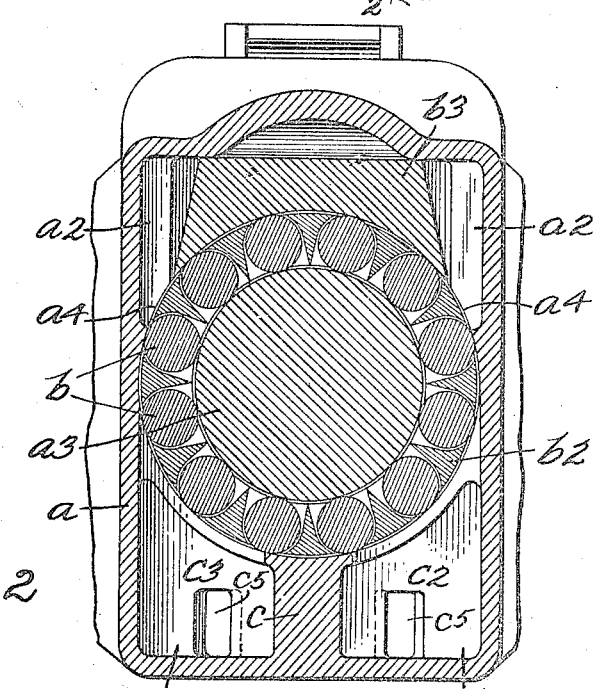
Fig. 2 is a section thereof on the line 2—2 of Fig. 1.

In the bottom of the box $a$ I provide a center track $c$ having four inclined branches arranged in pairs $c^2$ and $c^3$, respectively, giving the appearance of the letter X, and said branch tracks are approximately concentric with the axle $a^3$ and extend upwardly along the sides of the box a predetermined distance, as clearly shown in Figs. 2 and 3 and I provide the webs $c^4$ of the said tracks with openings $c^5$ permitting the free passage of lubricants therethrough when roller bearings are employed and permitting also the insertion of suitable packing when frictional bearings are employed, as well as permitting the escape of scale or other matter from the spaces between the tracks or webs.

In the use of roller bearings, in the form of construction shown, I curve the lower ends of the lugs $a^2$ as shown at $a^4$ concentrically with the axle $a^3$, said lugs serving as a bridge in the roller raceway between the bearing block $b^3$ and the tracks $c$, $c^2$, and $c^3$, the outer bearing for the said rollers thus comprising a plurality of these elements and being made of a diameter slightly greater than that of the roller exteriors, whereby the said cage of rollers may be inserted into the said outer bearing after being assembled about the journal of the axle and, as the axial strain is upon the rollers interposed between the journal and the bearing block $b^3$, there is a slight increase in the space between the journal and the track $c$ over the diameter of one of the rollers, thus permitting the rollers in the axial line of the box and closely adjacent thereto to clear the said journal and rest upon the crossed portion of the said tracks because of the radial movement of the said rollers in the cage.

The rollers in their planetary movement about the journal pass to the tracks at the extremities of the corresponding branches thereof and are supported at this point at each end thereof thus permitting any scale or other foreign matter thereon, between the ends, to drop into the bottom of the box, which thus becomes a refuse receptacle and, in the further movement of the rollers over the said tracks, this unengaged portion of the rollers becomes smaller and smaller until the bottom of the box has been reached at which time the rollers are supported centrally thereof, thus permitting the clearance of scale or foreign matter from the portions of the roller ends on either side of the track $c$.

When a roller is in this position, it is practically balanced in the center thereof, clear of the journal and is permitted to readjust itself if displaced from normal position in its planetary movement for any cause, after which the said roller or rollers rise gradually upon the other side of track branches, beginning a new cycle of movement and, in this movement, the engagement of the said rollers with the journal is gradual because of the gradually decreased distance between the tracks and the journal, from the track $c$ to the end of the branches thereof, the gripping of the said rollers thus being smoothly performed and, in this upward movement on the track branches, the rollers are again permitted to clear themselves of extraneous matter which might possibly not have been cleared therefrom in their downward movement over the opposite side of track branches.

My invention therefore consists in a plurality of diagonally arranged tracks in the bottom of the box crossing each other in the median line of the box whereby a relatively small roller bearing surface results, the arrangement of the tracks being such as to expose the entire length of rollers passing thereover above the refuse receptacle in the bottom of the box and, because of the central portion $c$, the rollers are permitted to readjust themselves as hereinbefore stated if displaced in their planetary movements, this form of construction being valuable under certain conditions and forming a continuity of roller support.

Having fully described my invention, what I claim as new, and desire to secure by Letters Patent, is:—

A journal box having a roller bearing member in the upper part thereof, a journal in said box, rollers interposed between said journal and bearing member, and roller bearing tracks in the lower part of said box, said tracks being two in number arranged at an angle to the axial plane of said journal and crossing each other in said axial plane beneath said journal whereby said rollers are supported and cleared at gradually changing points throughout the length thereof.

In testimony that I claim the foregoing as my invention I have signed my name in presence of the subscribing witnesses this 16th day of November, 1912.

JULIUS A. PERKINS.

Witnesses:
J. C. LARSEN.
H. C. KOPF.